June 27, 1950   J. G. TAPPERT   2,512,696
INTERMITTENT GEAR
Filed May 7, 1946   2 Sheets-Sheet 1
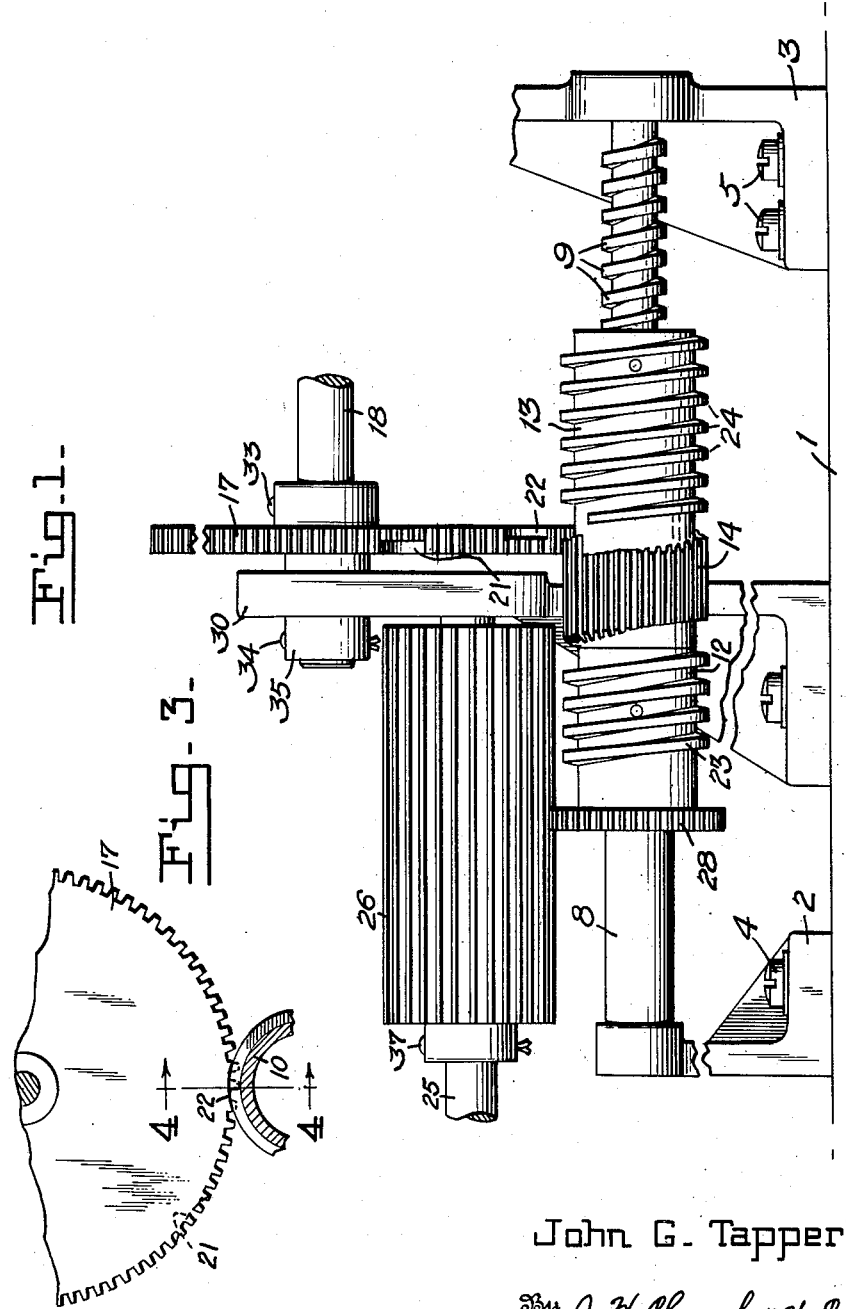
Inventor
John G. Tappert
By J. H. Church & W. E. Thibodeau
Attorney June 27, 1950   J. G. TAPPERT   2,512,696
INTERMITTENT GEAR
Filed May 7, 1946   2 Sheets-Sheet 2
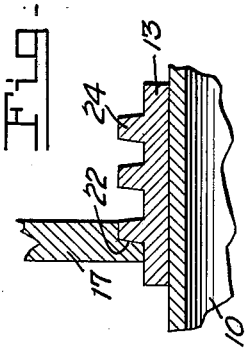
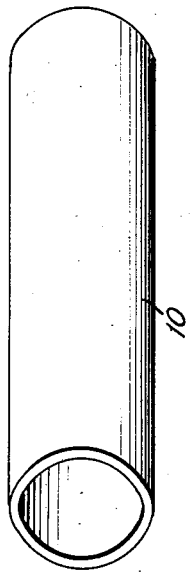
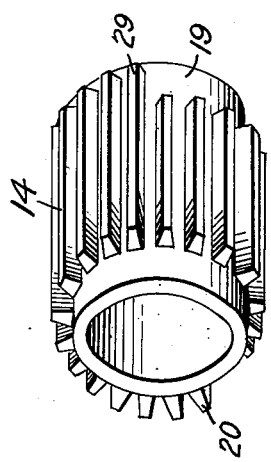
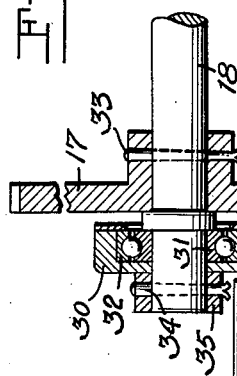
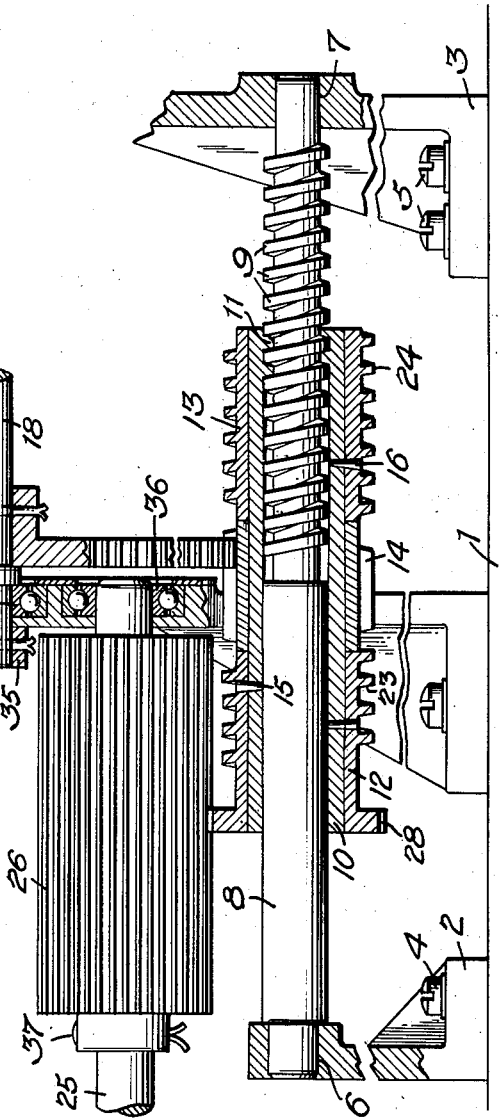
Inventor
John G. Tappert
By J. H. Church & H. E. Thibodeau
Attorney Patented June 27, 1950

2,512,696

UNITED STATES PATENT OFFICE 2,512,696

INTERMITTENT GEAR

John G. Tappert, Philadelphia, Pa.

Application May 7, 1946, Serial No. 667,782

10 Claims. (Cl. 74—435)

(Granted under the act of March 3, 1883, as amended April 30, 1928; 370 O. G. 757)

The invention described herein may be manufactured and used by or for the Government for governmental purposes without the payment to me of any royalty thereon.

This invention relates to intermittent mechanical drives. In certain types of precision instruments such as calculators and computers, special gears and other elements are used that, by their construction, are limited to a predetermined angle of rotation. For example, intermeshing gears having their pitch lines generally in the form of a spiral, helix, or other non-circular geometrical contours, are commonly used in many machines and instruments, whereby the rotations of two shafts or parts interconnected thereby have a definite, predetermined non-linear relation. To avoid injury to such gears, protective mechanisms are commonly employed limiting the gears to their permissible effective angles of rotation while permitting continued operation of the driving means therefor.

It is one purpose of this invention to provide an intermittent drive of general utility whereby a follower element or gear may be limited to a predetermined fixed degree of rotation despite a continued rotation of the driving element or gear.

A further object is to provide an intermittent drive as aforesaid, of particular utility in the protection of special types of gearing used in gun fire and other types of computers and calculators.

Another object is to provide an intermittent gear in which the periods of drive and dwell are not necessarily cyclic and are not necessarily limited to a single revolution.

Other objects and advantages of the invention will become apparent from the following description.

In the drawing,

Figure 1 is an elevational view showing the parts in one of the positions they occupy during driving of the intermittent gear and output shaft.

Figure 2 is a view similar to Figure 1 but showing certain parts in section.

Figure 3 is a sectional detail view taken in a plane normal to the axis of the fixed screw and showing the relation of the driven gear and axially-moving worm during the time the driven gear is at rest.

Figure 4 is a sectional detail view showing the parts in a position similar to that of Figure 3 and taken upon a plane indicated by the line 4—4, Figure 3.

Figure 5 is an enlarged perspective view of the special spiral-end driving gear.

Figure 6 is a perspective view of the combined sleeve and nut surrounding and engaging the fixed screw.

A base plate or support 1 has a pair of standards 2 and 3 fixed thereto as by means of fillet head screws 4 and 5. These standards have aligned apertures 6 and 7 within which a rod 8 is fixed. As shown upon Figures 1 and 2, this rod is threaded from one end for about half its length. The threads 9 are square and have the same external diameter as the smooth portion of the rod. A sleeve 10 has a smooth sliding fit on rod 8 and is provided at its right end, as seen in Figure 2, with threads 11 in engagement with threads 9 whereby, as the sleeve is rotated, it is simultaneously translated along the rod. As the threads 11 extend for only two or three turns about the sleeve, the latter may be translated throughout the full length of rod 8 between standards.

The sleeve 10 forms a mount for a pair of axially spaced sleeves having formed thereon threads 23 and 24 of equal pitch. Between these sleeves is interposed a special pinion 14 whose construction will be subsequently described. Parts 12, 13, and 14 have a snug fit on sleeve 10 and are secured thereto in axially abutting relation by any suitable means such as taper pins 15 and 16 fitting in holes which are drilled when assembling the drive. The pitch of the threads upon sleeves 12 and 13 is the same as that of threads 9. Pinion 14 has straight teeth whose lengths are coordinated or related with the diameter of driven gear 17 and the total or maximum angle of rotation through which driven shaft 18 is to be rotated. These teeth are integral with a base cylinder 19 whose square-cut ends are in abutting relation with the sleeves 12 and 13, respectively. The first tooth, identified as 20, Figure 5, has its near end flush with the end of base cylinder 19 and is rotatively positioned relatively to sleeve 12 so that its leading face is substantially flush with the adjacent terminal end of the thread on sleeve 12. That is, tooth 20 and the adjacent terminal end of the thread on sleeve 12, overlap by an amount substantially that of the thickness of the tooth. The end of each succeeding tooth is spaced a distance measured axially along the cylinder such that the ends conjointly define a 360° helix having the same pitch as the threads of sleeves 12 and 13. The end of the final tooth adjacent tooth 20, is, then, spaced from the end of tooth 20 by a distance substantially equal to the pitch of the threads.

The length of the teeth upon spiral pinion 14 will depend upon the desired maximum angle of rotation of the driven gear 17 and the ratio of the pitch diameters of pinion 14 and gear 17. At the limiting positions of its rotation, gear 17 has its teeth cut away for a portion of their length to form arcuate notches 21 and 22, having radii slightly greater than the radius of the maximum radius of the threads upon sleeves 12 and 13. The depth of the notches may conveniently be such that the length of the cut teeth on gear 17 is a little less than the axial dimension between consecutive threads. The pitch diameters are so selected that the notches are separated circumferentially of driven gear 17. The notches open through respectively opposite faces of gear 17 and, as clearly shown at Figure 1, each notch faces toward the threads engaged thereby.

Shaft 18 is journaled in antifriction bearings one of which is shown at 32 and carried by standards 3 and 30. As shown, taper pins 33 and 34, having split, spread ends, are used to secure gear 17 and a thrust collar 35, to shaft 18. Standard 30 also supports an antifriction bearing 36 which, in cooperation with another bearing, not shown, journals a drive shaft 25. Shaft 25 has an elongated drive pinion 26 pinned thereto as at 37. This pinion meshes with a pinion 28 integral with or otherwise secured to sleeve 12. The length and relation of pinion 26 are such that it is in mesh with pinion 28 for all axial positions of sleeve 10 along rod 8. Of course, if desired pinion 28 may be elongated instead of 26, in which event it would be necessary only to lengthen rod 8.

The parts are so assembled that the ends of the threads 23 and 24 adjacent spiral gear 17, ride into the respective notches 21 and 22 in gear 17, as the final long tooth on pinion 14 moves out of mesh with said gear. Thus, for example, consider shaft 25 and long pinion 26 rotating clockwise as seen from the left in Figure 1, so that the unit comprising sleeves 12, 13 and pinion 14 is driven by pinion 28 counterclockwise to drive gear 17 and shaft 18 clockwise. The aforesaid unit is simultaneously moving to the left along rod 8 under the action of threads 9 and 11. At the instant tooth 29 moves out of engagement with gear 17, the adjacent end of thread 24 is positioned within notch 22 and thus acts positively to prevent further rotation of gear 17 and to lock it in definite position. A like effect is produced when the direction of rotation of shaft 25 is reversed. The aforesaid unit 12, 13, 14, is translated to the right until tooth 29 picks up the teeth of gear 17. Rotation of gear 17 continues until long tooth 20 moves out of engagement with the gear while, at the same time, the adjacent end of thread 23 moves into notch 21 to thereby lock the gear against further rotation so long as shaft 25 and pinion 26 continue the assumed direction of rotation.

By the foregoing construction gear 17 and shaft 18 may be intermittently rotated through a predetermined desired angle and then positively locked in position. Numerous modifications will be obvious to those skilled in the art.

The intermittent drive thus disclosed is relatively simple while being positive and reliable in action. While I have shown the preferred form of my intermittent drive, numerous other modifications and substitutions, will occur to those skilled in the art. Hence the foregoing disclosure should be taken in an illustrative rather than a limiting sense, and I wish to reserve all such changes as fall within the scope of the subjoined claims.

Having now fully disclosed the invention, what I claim and desire to secure by Letters Patent is:

1. In an intermittent drive, a drive shaft, a driven shaft, a gear fixed to said driven shaft to rotate therewith, and means continuously operated by said drive shaft and engaging said gear to rotate the same for a predetermined portion only of the rotation of said drive shaft, said means including a pinion having the ends of its teeth defining two helices of equal pitch.

2. In an intermittent drive, a shaft, a gear fixed thereon, a threaded rod fixed parallel and adjacent said first shaft, a sleeve mounted on and threadedly engaging said rod, a threaded cylinder mounted on and fixed to said sleeve, a pinion fixed on said sleeve and adapted to mesh with said gear, said pinion having the ends of successive teeth spaced axially of said rod to define a 360° helix of the same pitch as the threads of said cylinder, and drive means rotating said sleeve to axially translate the same and cause said pinion and the threads of said cylinder successively to engage said gear, whereby said gear is rotated a predetermined amount by said pinion, then locked against rotation by engagement of said threads in notches in the periphery of said gear.

3. An intermittent drive comprising a gear rotatable on a first axis and having a pair of notches in the periphery thereof, one notch opening into one face only of said gear and the other notch opening into the other face only of said gear, and intermittent drive unit comprising a pair of threaded elements and a pinion interposed between said elements, said elements and pinion being fixed together in coaxial relation, said pinion having the ends of successive teeth spaced axially to define a pair of helices, and means mounting said drive unit for rotation on a second axis parallel to said first axis, said means acting to axially translate said unit in engagement with said gear whereby said gear is locked during engagement of the threads of said elements in said notches while rotated through a predetermined angle during engagement by said pinion.

4. In an intermittent drive, a driven gear rotatable on a first axis, a threaded rod fixed parallel to said axis and adjacent said gear, an intermittent unit comprising an internally threaded sleeve mounted on said rod and having fixed thereon a pair of axially-spaced threaded elements and a pinion, said pinion being interposed between said elements with the ends of successive teeth spaced axially of said rod to define a pair of 360° helices of the same pitch as the threads of said elements, there being notches in the periphery of said gear adapted to be engaged by the threads of said elements to lock said gear against rotation, and drive means connected to rotate said intermittent unit to cause said unit to simultaneously move axially along said rod, whereby a threaded element, said pinion and the remaining element, are successively brought into engagement with said gear to successively lock, rotate and again lock said gear.

5. An intermittent drive comprising a driven gear mounted for rotation on an axis, a threaded rod fixed adjacent said gear parallel to said axis, a sleeve mounted on and threadedly engaging said rod, an intermittent drive unit fixed on said sleeve concentrically of the axis of said rod, said unit comprising a pair of threaded cylinders and a pinion interposed therebetween, the outside diameters of said cylinders and pinion being substantially equal and the threads upon said rod and cylinders having equal pitch, said pinion being adapted to mesh with and drive said gear and having the ends of successive teeth spaced axially of said rod to define a pair of 360° helices of the same pitch as the threads of said elements, there being a pair of circumferentially-spaced, oppositely-disposed notches in the periphery of said gear, each positioned to be engaged by the thread of a respective cylinder to lock said gear against rotation as said pinion moves out of mesh therewith, and means for rotating said sleeve comprising a shaft, an elongated pinion fixed on said shaft, and a pinion fixed on said sleeve in mesh with said elongated pinion.

6. In an intermittent drive unit, pair of threaded elements, a pinion, means mounting said elements and pinion in fixed coaxial relationship with said pinion interposed between said elements, said pinion and elements having substantially the same external diameter, the ends of the teeth of said pinion defining helices each beginning in axially spaced relation with the adjacent terminus of the thread of a respective one of said elements.

7. An intermittent drive unit as in claim 6, each of the helices defined by the ends of the teeth of said pinion extending 360° about said gear whereby one pair of consecutive teeth at each end of said gear have their ends axially spaced a distance equal to the pitch of the threads of said elements.

8. An intermittent drive unit as in claim 6, a fixed rod having threads of the same effective pitch as the threads of said elements, said unit being rotatably mounted on, and threadedly engaging, said rod.

9. A component for an intermittent drive, said component comprising rigidly connected coaxial worm and pinion elements, the ends of successive teeth of said pinion being axially offset to define a helix of the same pitch as said worm.

10. In an intermittent drive, a driven shaft, a driven gear fixed to said shaft to rotate therewith and having a pair of notches in its periphery opening through respective faces of said gear, a drive unit comprising a pair of threaded elements and an interposed gear element, said gear element having the ends of successive teeth axially offset to define helices of the same pitch as the threads of said threaded elements, all said elements being axially aligned and connected for rotation as a unit, the axial dimension of the teeth of said driven gear at its notches being a little less than the axial distance between the threads of said threaded elements, and means to simultaneously rotate and axially translate said drive unit to bring said elements successively into operative engagement with said driven gear, the thread of each threaded element being adapted to engage in a respective notch of the driven gear to hold the same against rotation.

JOHN G. TAPPERT.

REFERENCES CITED

The following references are of record in the file of this patent:

UNITED STATES PATENTS

| Number | Name | Date |
|---|---|---|
| 2,323,415 | Overburg | July 6, 1943 |

FOREIGN PATENTS

| Number | Country | Date |
|---|---|---|
| 62,312 | Norway | Apr. 8, 1940 |
| 277,829 | Germany | Sept. 11, 1914 |